United States Patent
Maeda et al.

(10) Patent No.: US 11,666,983 B2
(45) Date of Patent: Jun. 6, 2023

(54) DRESSING QUALITY DETERMINATION METHOD FOR RESISTANCE WELDING ELECTRODES AND DEVICE FOR THE SAME

(71) Applicant: MAZDA MOTOR CORPORATION, Hiroshima (JP)

(72) Inventors: Yosuke Maeda, Aki-gun (JP); Daisuke Nakazaki, Aki-gun (JP); Akira Nawahara, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 269 days.

(21) Appl. No.: 17/161,457

(22) Filed: Jan. 28, 2021

(65) Prior Publication Data

US 2021/0245292 A1 Aug. 12, 2021

(30) Foreign Application Priority Data

Feb. 10, 2020 (JP) .............................. JP2020-020606

(51) Int. Cl.
*B23K 11/30* (2006.01)
*B23K 11/11* (2006.01)

(52) U.S. Cl.
CPC ........... *B23K 11/3063* (2013.01); *B23K 11/11* (2013.01)

(58) Field of Classification Search
CPC ............................ B23K 11/11; B23K 11/3063
See application file for complete search history.

(56) References Cited

U.S. PATENT DOCUMENTS

| 2011/0240605 A1* | 10/2011 | Takayama | B23K 11/36 |
| | | | 219/86.1 |
| 2016/0131597 A1* | 5/2016 | Leuckefeld | G01N 21/8806 |
| | | | 356/237.2 |

FOREIGN PATENT DOCUMENTS

| JP | 2018167302 A | 11/2018 |
| JP | 6843392 B2 * | 3/2021 |

* cited by examiner

*Primary Examiner* — Dana Ross
*Assistant Examiner* — Joe E Mills, Jr.
(74) *Attorney, Agent, or Firm* — Studebaker & Brackett PC

(57) ABSTRACT

To accurately make a dressing quality determination based on resistance waveforms, a dressing quality determination method determines the quality of dressing performed for electrodes when resistance welding is performed at a plurality of welding points. This method includes accumulating a known resistance waveform immediately after dressing the electrodes, and a known resistance waveform immediately before dressing the electrodes; creating, by a statistical method, a model for setting a threshold value for dressing quality determination, based on a plurality of known resistance waveforms immediately after dressing and a plurality of known resistance waveforms immediately before dressing; acquiring an unknown resistance waveform immediately after dressing the electrodes; and determining whether dressing is normal or dressing is abnormal by comparing the unknown resistance waveform immediately after dressing with the threshold value for dressing quality determination.

15 Claims, 8 Drawing Sheets

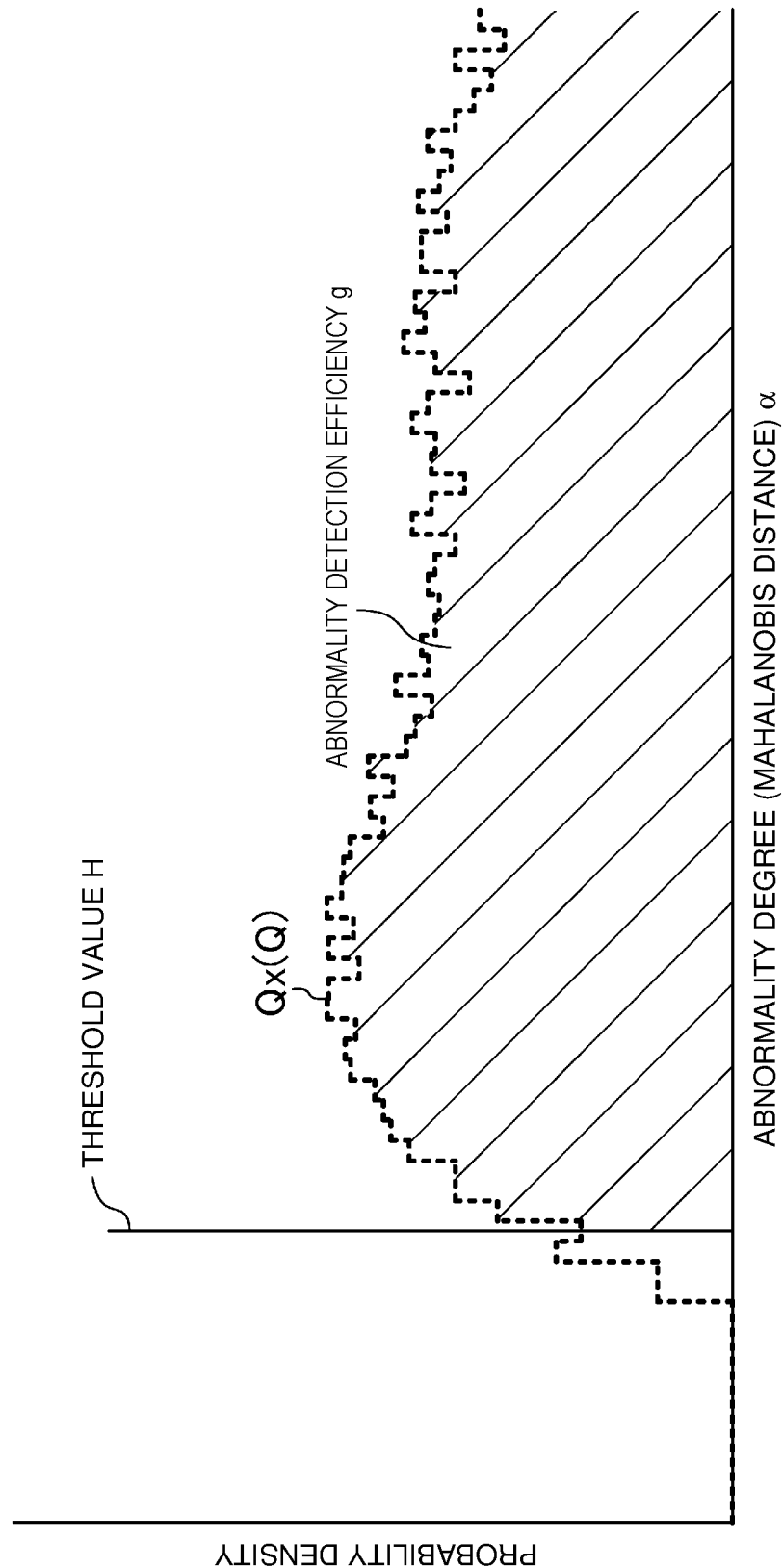

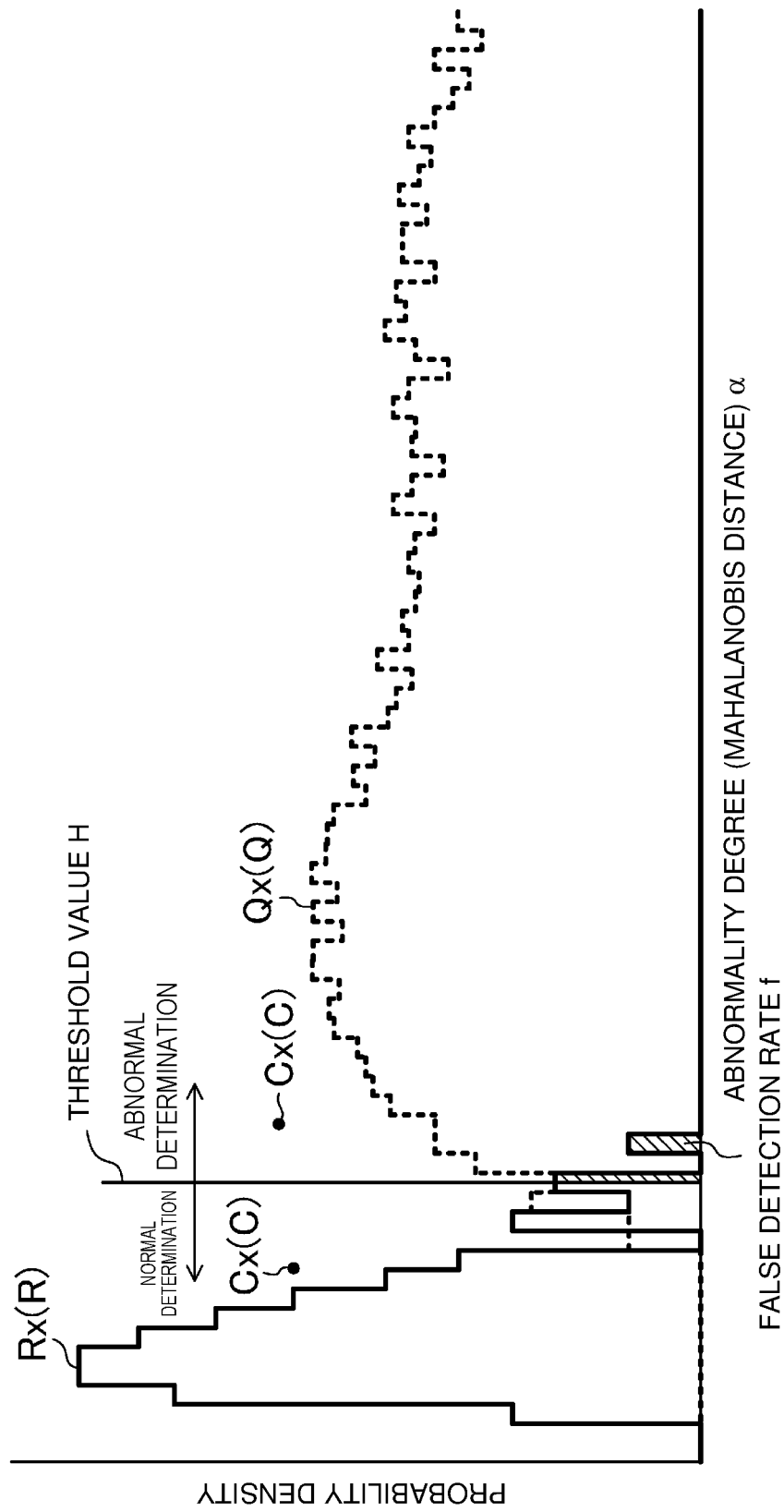

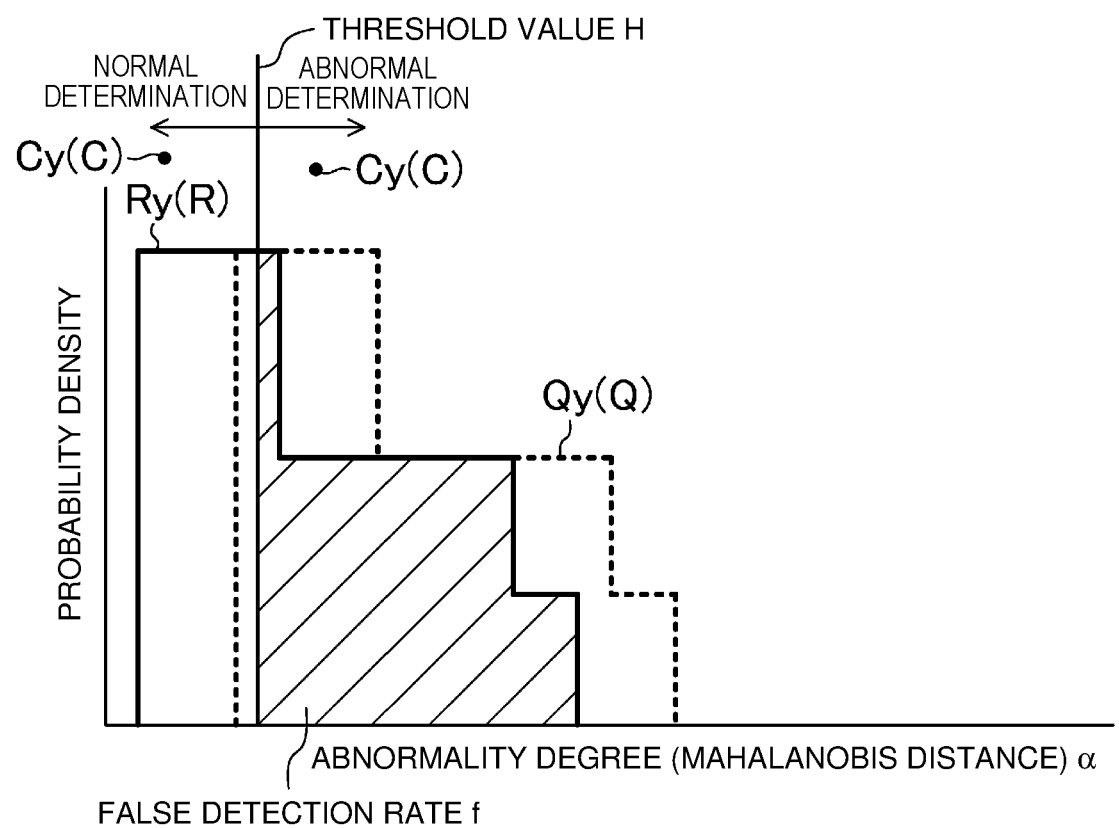

(A)

DRESSING QUALITY DETERMINATION METHOD FOR RESISTANCE WELDING ELECTRODES AND DEVICE FOR THE SAME

BACKGROUND

Technical Field

The present disclosure relates to a dressing quality determination method for resistance welding electrodes, and a device for the same.

Background Art

In electric resistance welding, a current is applied to a workpiece formed of a stack a plurality of metal plates while applying pressure with a pair of electrodes. Joule heat due to electrical resistance is generated in the plurality of metal plates, and portions in contact with the electrodes locally melt.

With repeated welding, the electrode tips wear and become larger in diameter. When welding is performed with the electrode tips in the state of being worn, sufficient Joule heat cannot be obtained due to small electrical resistance, which may lead to insufficient welding strength.

Therefore, dressing (polishing, hereinafter referred to as "dressing") is performed for each electrode tip at regular intervals. By performing dressing normally, the diameter of the electrode tip is decreased, sufficient Joule heat can be obtained, and welding strength can be ensured.

On the other hand, when dressing is insufficient, the electrode tip does not become thinner, and Joule heat is insufficient, which may lead to insufficient welding strength.

Hence, in order to ensure quality of strength, it is necessary to accurately determine dressing quality, that is, whether dressing is normal or abnormal.

Regarding a method and a device for determining dressing quality, various embodiments have been disclosed. For example, a dressing quality determination device for resistance welding electrodes according to Japanese Patent Laid-Open No. 2018-167302 has an electrically conducting medium that contacts the tips of a pair of electrodes; a measurement unit for measuring a resistance value of an electrically conducting medium when a current is applied to the electrically conducting medium through the pair of electrodes; and a determination unit for determining the dressing quality of the pair of electrodes, based on the resistance value of the electrically conducting medium measured by the measurement unit.

SUMMARY

Also, the resistance value between the pair of electrodes changes with passage of time. Therefore, as in Japanese Patent Laid-Open No. 2018-167302 mentioned above, determining the dressing quality based only on the resistance value of the electrically conducting medium at a certain time may lead to a false determination. For example, the gap between the metal plates has a great influence on the resistance value immediately after the start of applying the current. Hence, when a dressing quality determination is made based only on the resistance value at a certain time immediately after the start of applying the current, there is a possibility that dressing is determined to be abnormal despite the fact that dressing is actually normal, and vice versa.

Therefore, a method for determining the dressing quality based on the overall resistance waveform representing the relationship between the weld time and the resistance value is considered.

In order to accurately make a dressing quality determination by this method, it is necessary to appropriately set a threshold value as a determination criteria. However, the form of the resistance waveform varies depending on each welding point, or changes due to changes of the electrodes over years. Under such circumstances, it was difficult to appropriately set the threshold value, for dressing quality determination based on the resistance waveform.

The present disclosure has been made by taking these points into consideration, and mainly aims to accurately make a dressing quality determination based on resistance waveforms.

A dressing quality determination method for resistance welding electrodes according to the present disclosure is for determining the quality of dressing performed for a pair of electrodes when resistance welding to weld a plurality of metal plates is performed at a plurality of welding points by applying a current to a workpiece formed of a stack of the plurality of metal plates while applying pressure with the electrodes. The method includes an accumulation step of accumulating a plurality of known resistance waveforms immediately after dressing, each of which is a known resistance waveform immediately after dressing the electrodes, and a plurality of known resistance waveforms immediately before dressing, each of which is a known resistance waveform immediately before dressing the electrodes, at a welding point subject to dressing quality determination among the plurality of welding points; a model creation step of creating, by a statistical method, a model for setting a threshold value for dressing quality determination, based on the plurality of known resistance waveforms immediately after dressing and the plurality of known resistance waveforms immediately before dressing, at the welding point subject to determination; a waveform acquisition step of acquiring an unknown resistance waveform immediately after dressing, which is an unknown resistance waveform immediately after dressing the electrodes, at the welding point subject to determination; and a determination step of determining whether dressing performed for the electrodes is normal or abnormal by comparing the unknown resistance waveform immediately after dressing with the threshold value, at the welding point subject to determination.

Usually, the probability of dressing being normal is higher than the probability of dressing being abnormal. That is, most of the plurality of known resistance waveforms immediately after dressing are resistance waveforms when dressing is normal. On the other hand, the known resistance waveform immediately before dressing is a resistance waveform in a state in which the electrodes immediately before dressing are considerably worn, and approximates a resistance waveform when dressing is abnormal. Using these resistance waveforms (known resistance waveforms immediately after dressing) when dressing is normal and the resistance waveforms (known resistance waveforms immediately before dressing) when dressing is abnormal, an appropriate threshold value for dressing quality determination can be set by a statistical method. Therefore, it is possible to accurately make a dressing quality determination based on the resistance waveforms.

In one embodiment, the model creation step has a step of deriving a probability density function of a multidimensional normal distribution by maximum likelihood estimation based on a plurality of known resistance waveforms immediately after dressing for training, which are part of the plurality of known resistance waveforms immediately after dressing; a step of setting the threshold value that covers abnormality detection efficiency, which represents a predetermined proportion from a higher abnormality degree defined by the Mahalanobis distance pertaining to the probability density function, in a first probability distribution obtained by substituting the plurality of known resistance waveforms immediately before dressing for the probability density function; and a step of setting a proportion of a portion having the abnormality degree equal to or higher than the threshold value in a second probability distribution as a false detection rate, the second probability distribution being obtained by substituting a plurality of known resistance waveforms immediately after dressing for validation, which are other part of the plurality of known resistance waveforms immediately after dressing, for the probability density function, and the determination step compares the abnormality degree of the unknown resistance waveform immediately after dressing with the threshold value, and determines that dressing is normal when the abnormality degree is equal to or less than the threshold value, and determines that dressing is abnormal when the abnormality degree is equal to or higher than the threshold value.

According to this configuration, the reliability of a determination result of dressing quality in the determination step can be found based on the false detection rate. By considering the false detection rate, it is possible to examine whether or not the determination result obtained in the determination step is correct.

In one embodiment, a welding point set composed of a plurality of successive welding points subject to determination is formed, a re-determination step of re-determining dressing quality by considering likelihood of a determination result in the determination step, at each of the welding points in the welding point set is further included, and the re-determination step has a step of deriving negative log-likelihood based on the determination result and the false detection rate under a normal assumption, the normal assumption being an assumption that dressing is normal, and deriving negative log-likelihood based on the determination result and the abnormality detection efficiency under an abnormal assumption, the abnormal assumption being an assumption that dressing is abnormal; a step of deriving a sum total of the negative log-likelihood under the normal assumption of each of the welding points in the welding point set, and a sum total of the negative log-likelihood under the abnormal assumption of each of the welding points in the welding point set; and a step of re-determining that dressing is normal when the sum total of the negative log-likelihood under the normal assumption is equal to or less than the sum total of the negative log-likelihood under the abnormal assumption, and re-determining that dressing is abnormal when the sum total of the negative log-likelihood under the normal assumption is equal to or higher than the sum total of the negative log-likelihood under the abnormal assumption.

Since the forms of the resistance waveforms vary depending on each welding point, the reliability of the false detection rate, that is, the determination result in the determination step also varies depending of each welding point. According to this configuration, a welding point set constituted by successive welding points subject to determination is formed. Then, the negative log-likelihood at each welding point in the welding point set is derived. Thus, a weight based on the reliability of the determination result at each welding point is given. Using the sum totals of the negative log-likelihood at each of the welding points for dressing quality determination, a re-determination of dressing quality for the entire welding point set is made by placing great importance on the determination result at the welding point with high reliability (low false detection rate). Hence, it is possible to make a more reliable dressing quality determination.

In one embodiment, the unknown resistance waveform immediately after dressing on which the re-determination was made that dressing was normal in the re-determination step is further accumulated as the known resistance waveform immediately after dressing.

According to this configuration, since new data about the known resistance waveform immediately after dressing can be accumulated while performing resistance welding, good efficiency is achieved.

In one embodiment, the dressing quality determination method is incorporated into a welding step in a production line, and the determination is made in parallel with performing the resistance welding.

According to this configuration, the dressing quality can be determined without extending production tact time.

A dressing quality determination device for resistance welding electrodes is for determining the quality of dressing performed for a pair of electrodes when resistance welding to weld a plurality of metal plates is performed at a plurality of welding points by applying a current to a workpiece formed of a stack of the plurality of metal plates while applying pressure with the electrodes, and includes accumulation means for accumulating a plurality of known resistance waveforms immediately after dressing, each of which is a known resistance waveform immediately after dressing the electrodes, and a plurality of known resistance waveforms immediately before dressing, each of which is a known resistance waveform immediately before dressing the electrodes, at a welding point subject to dressing quality determination among the plurality of welding points; model creation means for creating, by a statistical method, a model for setting a threshold value for dressing quality determination, based on the plurality of known resistance waveforms immediately after dressing and the plurality of known resistance waveforms immediately before dressing, at the welding point subject to determination; waveform acquisition means for acquiring an unknown resistance waveform immediately after dressing, which is an unknown resistance waveform immediately after dressing the electrodes, at the welding point subject to determination; and determination means for determining whether dressing performed for the electrodes is normal or abnormal by comparing the unknown resistance waveform immediately after dressing with the threshold value, at the welding point subject to determination.

In one embodiment, the model creation means has function deriving means for deriving a probability density function of a multidimensional normal distribution by maximum likelihood estimation based on a plurality of known resistance waveforms immediately after dressing for training, which are part of the plurality of known resistance waveforms immediately after dressing; threshold value setting means for setting the threshold value that covers abnormality detection efficiency, which represents a predetermined proportion from a higher abnormality degree defined by the Mahalanobis distance pertaining to the probability density function, in a first probability distribution obtained by substituting the plurality of known resistance waveforms immediately before dressing for the probability density function;

and false detection rate setting means for setting a proportion of a portion having the abnormality degree equal to or higher than the threshold value in a second probability distribution as a false detection rate, the second probability distribution being obtained by substituting a plurality of known resistance waveforms immediately after dressing for validation, which are other part of the plurality of known resistance waveforms immediately after dressing, for the probability density function, and the determination means compares the abnormality degree of the unknown resistance waveform immediately after dressing with the threshold value, and determines that dressing is normal when the abnormality degree is equal to or less than the threshold value, and determines that dressing is abnormal when the abnormality degree is equal to or higher than the threshold value.

In one embodiment, a welding point set composed of a plurality of successive welding points subject to determination is formed, re-determination means for re-determining dressing quality by considering likelihood of a determination result in the determination means, at each of the welding points in the welding point set is further included, and the re-determination means has log-likelihood deriving means for deriving negative log-likelihood based on the determination result and the false detection rate under a normal assumption, the normal assumption being an assumption that dressing is normal, and deriving negative log-likelihood based on the determination result and the abnormality detection efficiency under an abnormal assumption, the abnormal assumption being an assumption that dressing is abnormal; log-likelihood sum deriving means for deriving a sum total of the negative log-likelihood under the normal assumption of each of the welding points in the welding point set, and a sum total of the negative log-likelihood under the abnormal assumption of each of the welding points in the welding point set; and log-likelihood sum comparing means for re-determining that dressing is normal when the sum total of the negative log-likelihood under the normal assumption is equal to or less than the sum total of the negative log-likelihood under the abnormal assumption, and re-determining that dressing is abnormal when the sum total of the negative log-likelihood under the normal assumption is equal to or higher than the sum total of the negative log-likelihood under the abnormal assumption.

In one embodiment, the unknown resistance waveform immediately after dressing on which the re-determination was made that dressing was normal by the re-determination means is further accumulated as the known resistance waveform immediately after dressing in the accumulation means.

In one embodiment, the dressing quality determination device is installed in a resistance welding device introduced in a production line, and makes the determination in parallel with the resistance welding device performing the resistance welding.

According to the present disclosure, it is possible to accurately make a dressing quality determination based on resistance waveforms.

BRIEF DESCRIPTION OF THE DRAWINGS

FIG. 4 is a graph showing a mode for setting a threshold value, for a first probability distribution pertaining to the welding point X;

FIG. 5 is a graph showing a mode for setting a false detection rate, for a second probability distribution pertaining to the welding point X;

FIG. 6 is a view equivalent to FIGS. 4 and 5, pertaining to a welding point Y;

DETAILED DESCRIPTION

Hereinafter, an embodiment of the present disclosure will be described in detail based on the drawings. The following description of the preferred embodiment essentially just shows an example, and does not intend to limit the present disclosure, and objects or application to which the present disclosure is applied.

<Configuration of Spot Welding Device>

A dressing quality determination device for resistance welding electrodes according to the embodiment of the present disclosure is installed in a spot welding device as a resistance welding device. The spot welding device resistance-welds a plurality of metal plates. Specifically, the spot welding device welds the plurality of metal plates by applying a current to a workpiece formed of a stack of the plurality of metal plates while applying pressure with a pair of electrodes.

In the present embodiment, a plurality of spot welding devices are introduced in a welding step in an automobile production line. In the welding step, the spot welding devices perform resistance welding of a plurality of pressed parts formed in a previous step, that is, a press step, at a plurality of welding points. The number of the pressed parts is, for example, several hundreds to several thousands. The number of the welding points is, for example, several thousands to tens of thousands.

Figure 1A:
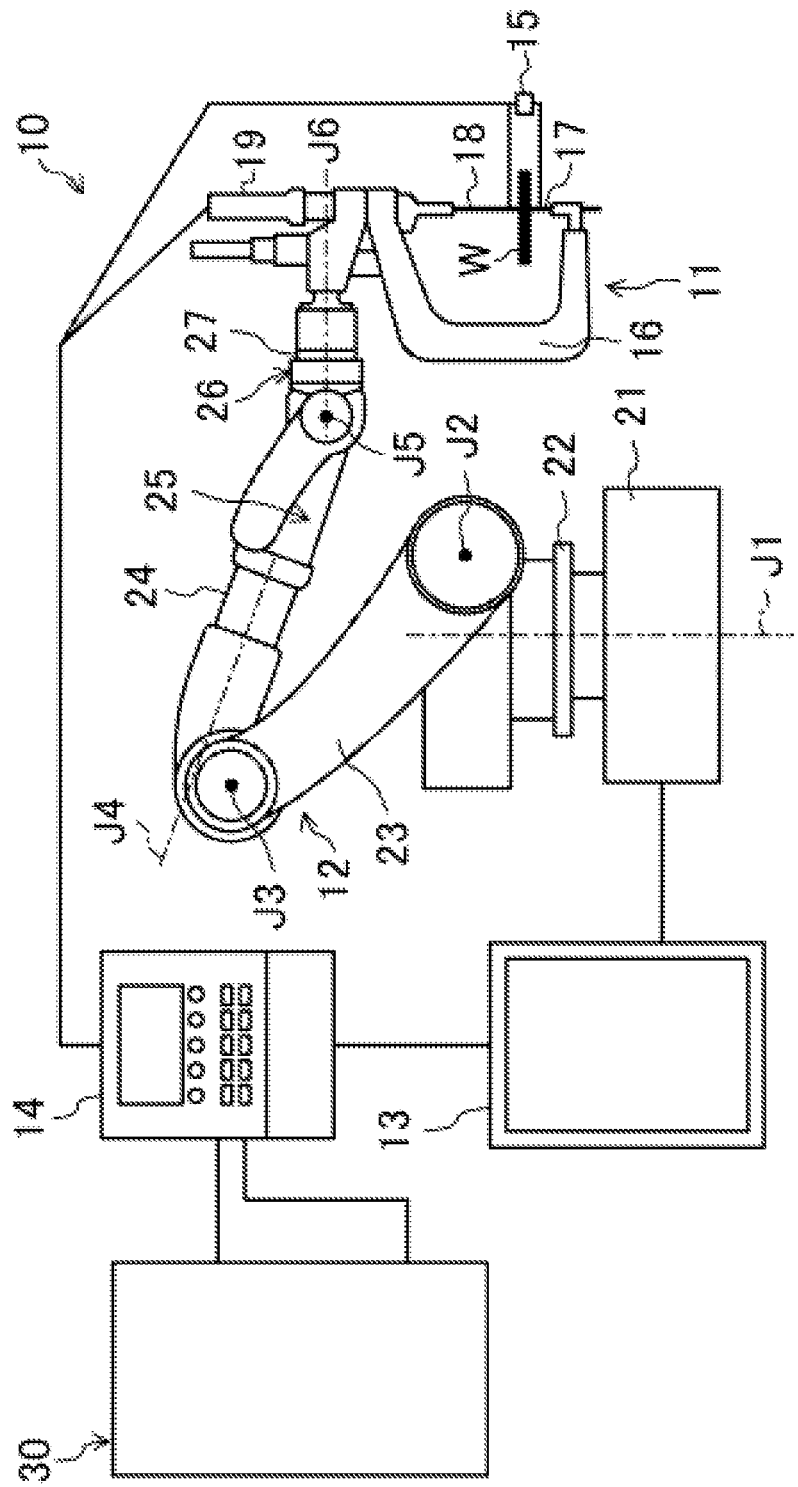
FIG. 1A is a structural view showing a spot welding device.

FIG. 1A shows the overall configuration of a spot welding device 10. As described above, a dressing quality determination device 30 is provided for the spot welding device 10. The spot welding device 10 includes a welding gun 11, an arm-type robot 12 for holding the welding gun 11, a robot control apparatus 13, a welding control apparatus (welding timer) 14, a voltmeter 15, and the dressing quality determination device 30.

The welding gun 11 is a C-type welding gun, and includes an arm 16, a pair of mutually facing electrodes (fixed electrode 17 and movable electrode 18) mounted on the arm 16, and a servomotor 19 for driving the movable electrode 18. The servomotor 19 is controlled by the robot control apparatus 13.

The robot 12 is a multi-joint robot having six joint axes J1 to J6. The robot 12 includes, on a base 21, a revolving portion 22, a lower arm 23, an upper arm 24, and first to third distal end portions 25 to 27, which are configured to be mutually swingable. The robot 12 includes servomotors (not shown) that drive members around the respective joint axis J1 to J6. The servomotors are controlled by the robot control apparatus 13.

The voltmeter 15 measures the magnitude of voltage between the electrodes 17 and 18, at predetermined time intervals. The welding control apparatus 14 controls the welding current flowing time and the magnitude of the current, and monitors the time and the magnitude of flowing welding current. The welding control apparatus 14 calculates a resistance value between the electrodes 17 and 18, at predetermined time intervals, based on the current value of the welding current and the voltage value between the electrodes 17 and 18 measured by the voltmeter 15. The welding control apparatus 14 produces a waveform representing the relationship between the resistance value between the electrodes 17 and 18 and the weld time (hereinafter referred to as the "resistance waveform").

The welding control apparatus 14 applies, based on welding conditions and a welding command received from the robot control apparatus 13, the controlled welding current from the electrodes 17 and 18 to a workpiece W in a state in which the workpiece W is held between the electrodes 17 and 18 with a specified pressing force. After completion of applying the current, a welding completion signal is sent from the welding control apparatus 14 to the robot control apparatus 13. The dressing quality determination device 30 is connected to the welding control apparatus 14.

The dressing quality determination device 30 determines the quality of dressing performed for the electrodes, at a welding point subject to determination. The welding point subject to determination is a welding point where resistance welding is performed immediately after dressing the electrodes, among a plurality of welding points at which the spot welding device 10 performs resistance welding. Specifically, the welding point subject to determination is a welding point in a range from the first welding point to the tenth or so welding point immediately after dressing the electrodes, and is a welding point where resistance welding is performed in a state in which the electrode tips are not worn. In this embodiment, there are a plurality of welding points subject to determination. Hereinafter, among the plurality of welding points subject to determination, a welding point X and a welding point Y will be shown as examples.

<Form of Resistance Waveform at Each Welding Point>

Figure 2:
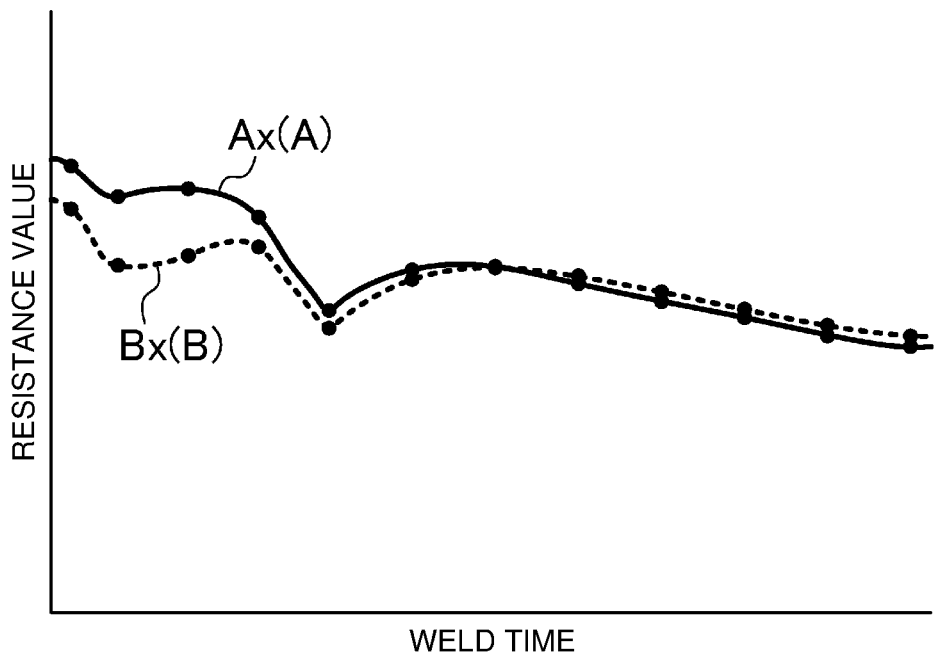
FIG. 2 is a graph showing resistance waveforms pertaining to a welding point X.

FIG. 2 shows resistance waveforms pertaining to the welding point X. The horizontal axis represents the weld time, and the vertical axis represents the resistance value. As shown in FIG. 2, the resistance waveforms are graphed based on M (for example, 12) measurement points at which measurements were made at predetermined time intervals (the same is applied below).

The solid line shown in FIG. 2 is a resistance waveform Ax immediately after dressing the electrodes at the welding point X. Usually, the probability of dressing being normal is higher than the probability of dressing being abnormal. Therefore, in FIG. 2, the resistance waveform immediately after dressing when dressing is normal is shown. As shown in FIG. 2, in the resistance waveform Ax, the resistance value rises and falls amid after starting the application of the current, and then finally decreases smoothly with the passage of time. The resistance waveform Ax has two extremely small peaks.

The broken line shown in FIG. 2 is a resistance waveform Bx immediately before dressing the electrodes at the welding point X. The resistance waveform Bx is a resistance waveform in a state in which the electrodes immediately before dressing are considerably worn, and approximates a resistance waveform when dressing is abnormal. As shown in FIG. 2, in the resistance waveform Bx, the resistance value rises and falls amid after starting the application of the current, and then finally decreases smoothly with the passage of time. The resistance waveform Bx has two extremely small peaks.

Here, as shown in FIG. 2, it is found by comparing the resistance waveform Ax and the resistance waveform Bx that the resistance value of the resistance waveform Bx is smaller than the resistance value of the resistance waveform Ax immediately after starting the application of the current. In particular, the difference between the two resistance values is clear at the first extremely small peak. Thus, at the welding point X, the resistance waveform Ax immediately after dressing and the resistance waveform Bx immediately before dressing are well separated. In short, at the welding point X, the resistance waveform when dressing is normal and the resistance waveform when dressing is abnormal are well separated.

Figure 3:
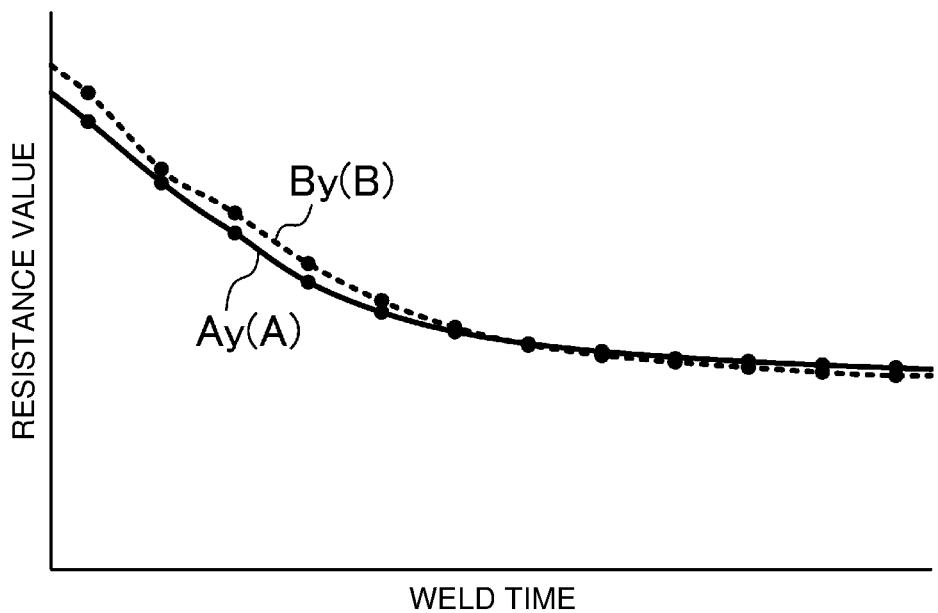
FIG. 3 is a graph showing resistance waveforms pertaining to a welding point Y.

FIG. 3 shows resistance waveforms pertaining to the welding point Y. The welding point Y is a welding point different from the welding point X. The solid line shown in FIG. 3 is a resistance waveform Ay immediately after dressing at the welding point Y. Like the welding point X, in FIG. 3, the resistance waveform immediately after dressing when dressing is normal is shown. As shown in FIG. 3, in the resistance waveform Ay, the resistance value finally decreases smoothly with the passage of time after starting the application of the current.

The broken line shown in FIG. 3 is the resistance waveform By immediately before dressing at the welding point Y. Like the welding point X, the resistance waveform Bx approximates a resistance waveform when dressing is abnormal.

Here, as shown in FIG. 3, when the resistance waveform Ay and the resistance waveform By are compared, the resistance waveforms almost overlap with each other, and have little difference. Thus, at the welding point Y, the resistance waveform Ay immediately after dressing and the resistance waveform By immediately before dressing are poorly separated. In short, at the welding point Y, the resistance waveform when dressing is normal and the resistance waveform when dressing is abnormal are poorly separated.

As described above, since the forms of the resistance waveforms vary depending on each welding point, the quality of the separation between the resistance waveform when dressing is normal and the resistance waveform when dressing is abnormal also varies depending on each welding point. In short, at the welding point X, it is relatively easy to make a dressing quality determination based on the resistance waveforms. On the other hand, at the welding point Y, it is relatively difficult to make a dressing quality determination based on the resistance waveforms.

<Configuration of Dressing Quality Determination Device for Resistance Welding Electrodes>

Figure 1B:
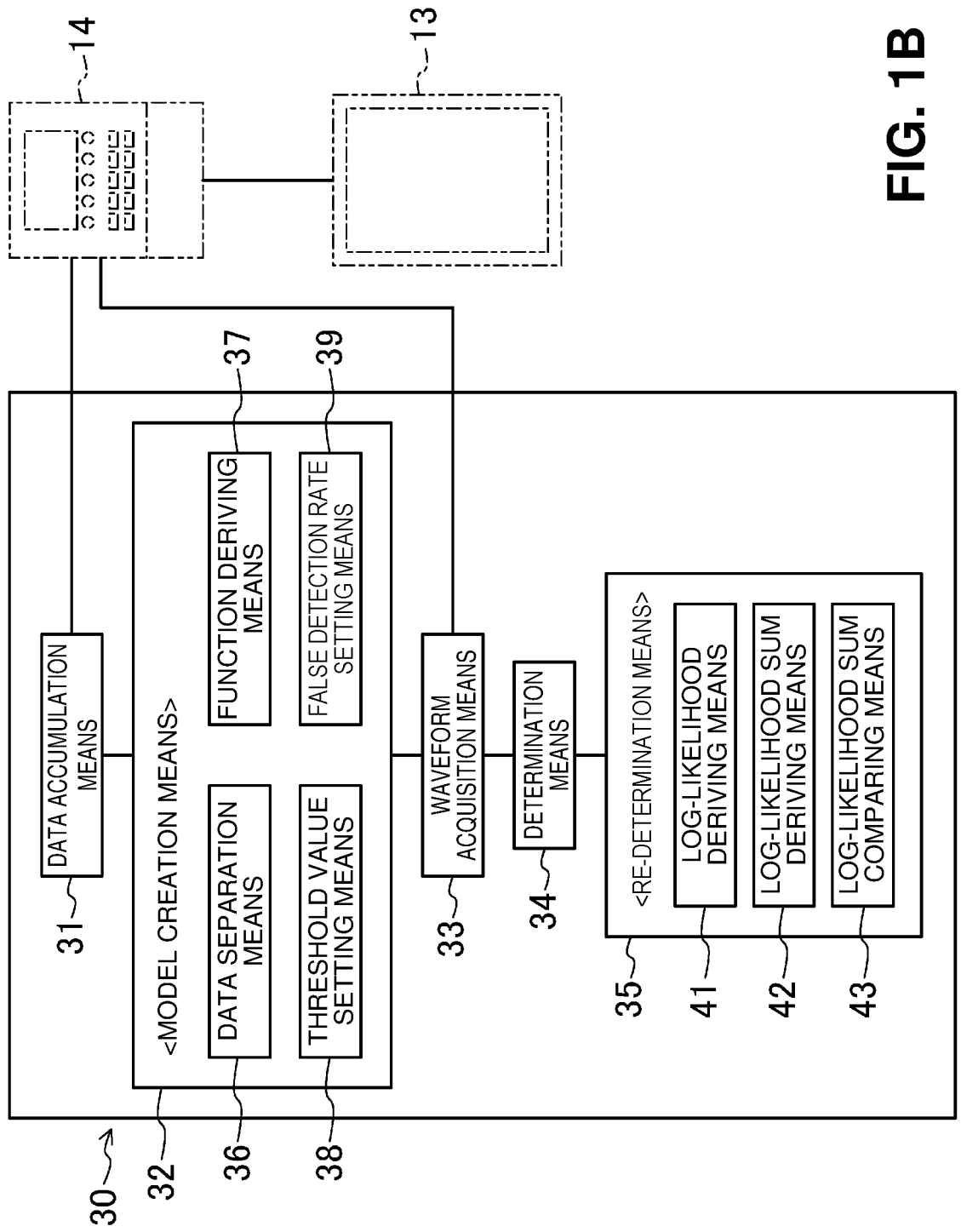
FIG. 1B is a structural view showing a dressing quality determination device.

FIG. 1B shows the configuration of the dressing quality determination device 30. As shown in FIG. 1B, the dressing quality determination device 30 is constituted by an electronic circuit composed of data accumulation means 31, model creation means 32, waveform acquisition means 33, determination means 34, and re-determination means 35, and includes a microcomputer configured and programmed to perform the operations data of the accumulation means 31, the model creation means 32, the waveform acquisition means 33, the determination means 34, and the re-determination means 35.

(Accumulation of Data About Known Resistance Waveforms)

The data accumulation means 31 accumulates a plurality of known resistance waveforms A immediately after dressing, which are known resistance waveforms immediately after dressing the electrodes, at each welding points subject to determination (for example, the welding points X, Y). Moreover, the data accumulation means 31 accumulates a plurality of known resistance waveforms B immediately before dressing, which are known resistance waveforms immediately before dressing the electrodes, at each of the welding points subject to determination. For the known resistance waveforms A immediately after dressing and the known resistance waveforms B immediately before dressing, a statistically sufficient number of pieces of data (for example, 100 resistance waveforms for each welding point) are required.

(Creation of Determination Model)

The model creation means 32 creates, by a statistical method, a model for setting a threshold value for dressing quality determination and a later-described false detection rate, based on a plurality of known resistance waveforms A immediately after dressing and a plurality of known resistance waveforms B immediately before dressing, at each welding point subject to determination. In the present embodiment, Hotelling's T-squared method is used as the statistical method. The statistical method is not limited to Hotelling's T-squared method, and various known methods may be used.

The model creation means 32 has data separation means 36, function deriving means 37, threshold value setting means 38, and false detection rate setting means 39.

The data separation means 36 separates data about the plurality of known resistance waveforms A immediately after dressing into two groups. Specifically, part of the plurality of known resistance waveforms A immediately after dressing is grouped as a plurality of known resistance waveforms A1 immediately after dressing for training. Meanwhile, other part of the plurality of known resistance waveforms A immediately after dressing is grouped as a plurality of known resistance waveforms A2 immediately after dressing for validation. The ratio of the two groups is, for example, the known resistance waveforms A1 immediately after dressing for training the known resistance waveforms A2 immediately after dressing for validation=4:1.

The function deriving means 37 determines a parameter of a multidimensional normal distribution by maximum likelihood estimation, based on the plurality of known resistance waveforms A1 immediately after dressing for training, and derives a probability density function P. Specifically, the probability density function P is a probability density function of M-dimensional normal distribution as shown in Equation (1) below. Here, the number M of dimensions is based on the number M of measurement points (for example, 12) at predetermined time intervals in each resistance waveform (see FIGS. 2 and 3).

[Expression 1]

$$P(x; \mu, \sum) = \frac{1}{\sqrt{(2\pi)^M |\sum|}} \exp\left[-\frac{1}{2}\alpha^2\right] \quad \text{Equation (1)}$$

In Equation (1), x is a random variable, and the bold letter represents a vector. μ is the mean, and Σ is the covariance, which are shown in Equations (2) and (3) below. α is the Mahalanobis distance and shown in Equation (4) below.

[Expression 2]

$$\mu_i = \frac{1}{N}\sum_{n=1}^{N} x_{i,n} \quad \text{Equation (2)}$$

[Expression 3]

$$\sum_{i,j} = \frac{1}{N}\sum_{n=1}^{N}(x_{i,n}-\mu_i)(x_{j,n}-\mu_j) \quad \text{Equation (3)}$$

[Expression 4]

$$\alpha = \sqrt{(x-\mu)^T \Sigma^{-1}(x-\mu)} \quad \text{Equation (4)}$$

In Equations (2) and (3), N is the number of pieces of data about the known resistance waveform A1 for training at each welding point. i and j are measurement points at predetermined time intervals in each resistance waveform, and are substituted with numerical values 1 to M (for example, M=12). By substituting Equation (4) into Equation (1), Equation (5) below is obtained.

[Expression 5]

$$P(x; \mu, \sum) = \frac{1}{\sqrt{(2\pi)^M |\sum|}} \exp\left[-\frac{1}{2}(x-\mu)^T \sum^{-1}(x-\mu)\right] \quad \text{Equation (5)}$$

When the plurality of known resistance waveforms B immediately before dressing are substituted for the probability density function P represented by Equation (5), a first probability distribution Q is obtained. Here, the Mahalanobis distance a (Equation (4)) pertaining to the probability density function P is defined as the abnormality degree (hereinafter may be referred to as the "abnormality degree α"). FIG. 4 shows an example of a mode for setting a threshold value H for dressing quality, in a first probability distribution Qx (broken line) pertaining to the welding point X. The horizontal axis represents the abnormality degree (Mahalanobis distance) α, and the vertical axis represents the probability density.

The threshold value setting means 38 sets the threshold value H for dressing quality. Specifically, as shown in FIG. 4, in the first probability distribution Q, the threshold value setting means 38 defines a predetermined proportion (hatching portion in FIG. 4) from the higher abnormality degree α as an abnormality detection efficiency g, and sets the threshold value H that covers the abnormality detection efficiency g. In the present embodiment, the abnormality detection efficiency g is 0.99 (99%).

When the plurality of known resistance waveforms A2 immediately after dressing for validation is substituted for the probability density function P, a second probability distribution R is obtained. FIG. 5 shows an example of a mode for setting a later-described false detection rate f, in a second probability distribution Rx (solid line) pertaining to the welding point X. The horizontal axis represents the abnormality degree (Mahalanobis distance) α, and the vertical axis represents the probability density.

The false detection rate setting means 39 sets the false detection rate f. The false detection rate f is a probability that dressing is erroneously determined to be abnormal despite the fact that dressing is actually normal. Specifically, in the second probability distribution R as shown in FIG. 5, the false detection rate setting means 39 sets the proportion of a portion (hatching portion in FIG. 5) where the abnormality degree α in the second probability distribution R is equal to or higher than the threshold value H as the false detection rate f.

(Acquisition of Unknown Resistance Waveform)

The waveform acquisition means 33 acquires data about an unknown resistance waveform C immediately after dressing, which is an unknown resistance waveform immediately after dressing the electrodes, at each welding point subject to determination.

(Dressing Quality Determination)

The determination means 34 determines whether dressing performed for the electrodes are normal or abnormal by comparing the unknown resistance waveform C immediately after dressing with the threshold value for dressing quality determination, at each welding point subject to determination.

Specifically, as shown in FIG. 5, the determination means 34 compares the abnormality degree α of the unknown resistance waveform C immediately after dressing and the threshold value H. When the abnormality degree a of the unknown resistance waveform C immediately after dressing is equal to or less than the threshold value H, the determination means 34 determines that dressing is normal. On the other hand, when the abnormality degree α of the unknown resistance waveform C immediately after dressing is equal to or higher than the threshold value H, the determination means 34 determines that dressing is abnormal.

(Dressing Quality Re-determination)

FIG. 6 shows an example of a first probability distribution Qy (broken line) and a second probability distribution Ry (solid line) pertaining to the welding point Y. As described above, at the welding point Y, the resistance waveform Ay immediately after dressing and the resistance waveform By immediately before dressing are poorly separated (see FIG. 3). In short, at the welding point Y, the resistance waveform when dressing is normal and the resistance waveform when dressing is abnormal are also poorly separated. Therefore, a false detection rate fy at the welding point Y is higher than a false detection rate fx at the welding point X (see FIGS. 5 and 6). At a welding point with a high false detection rate f such as the welding point Y, the reliability of the result of the dressing quality determination made by the determination means 34 is low.

Hence, the re-determination means 35 makes a re-determination for dressing quality by considering the reliability of the dressing quality determination made by the determination means 34 for each welding point. First, a welding point set composed of a plurality of successive welding points subject to determination is formed. Then, the re-determination means 35 makes a re-determination for dressing quality by considering the likelihood of the result of the determination made by the determination means 34, for each of the welding points in the welding point set.

The re-determination means 35 has log-likelihood deriving means 41, log-likelihood sum deriving means 42, and log-likelihood sum comparing means 43.

Defining an assumption that dressing is normal as a normal assumption, the log-likelihood deriving means 41 derives negative log-likelihood d based on a determination result y and the false detection rate f under the normal assumption. On the other hand, defining an assumption that dressing is abnormal as an abnormal assumption, the log-likelihood deriving means 41 derives negative log-likelihood based on the determination result y and the abnormality detection efficiency g under the abnormal assumption. The negative log-likelihood d under the normal assumption is shown in Equation (6) below. The negative log-likelihood e under the abnormal assumption is shown in Equation (7) below.

[Expression 6]

$$d_i = -\{y_i \ln f_i + (1-y_i)\ln(1-f_i)\} \quad \text{Equation (6)}$$

[Expression 7]

$$e_i = -\{y_i \ln g_i + (1-y_i)\ln(1-g_i)\} \quad \text{Equation (7)}$$

In Equations (6) and (7), yi is the result of determination made by the determination means 34. When the determination means 34 determines that dressing is normal, 0 is substituted for yi. When the determination means 34 determines that dressing is abnormal, 1 is substituted for yi. i represents each welding point in the welding point set. In the present embodiment, 0.99 is substituted for the abnormality detection efficiency gi in Equation (7).

The log-likelihood sum deriving means 42 derives a sum total D of the negative log-likelihood d under the normal assumption of each of the welding points in the welding point set. Moreover, the log-likelihood sum deriving means 42 derives a sum total E of the negative log-likelihood e under the abnormal assumption of each of the welding points in the welding point set. The sum total D of the negative log-likelihood d under the normal assumption and the sum total E of the negative log-likelihood e under the abnormal assumption are shown in Equations (8) and (9), respectively.

[Expression 8]

$$D = \Sigma d_i \quad \text{Equation (8)}$$

[Expression 9]

$$E = \Sigma e_i \quad \text{Equation (9)}$$

In Equations (8) and (9), i represents each welding point in the welding point set.

When the sum total D of the negative log-likelihood d under the normal assumption is equal to or less than the sum total E of the negative log-likelihood e under the abnormal assumption, the log-likelihood sum comparing means 43 re-determines that dressing is normal. On the other hand, when the sum total D of the negative log-likelihood d under the normal assumption is equal to or higher than the sum total E of the negative log-likelihood e under the abnormal assumption, the log-likelihood sum comparing means 43 re-determines that dressing is abnormal.

One example is shown. For the sake of simplicity, assume that the number of welding points in a welding point set to be considered by the re-determination means 35 is three. At the first welding point, the false detection rate f1=0.01 (1%), and the result of determination made by the determination means 34 is a "normality determination". At the second welding point, the false detection rate f2=0.08 (8%), and the result of determination made by the determination means 34 is an "abnormality determination". At the third welding point, the false detection rate f3=0.15 (15%), and the result of determination made by the determination means 34 is an "abnormality determination". In this case, the sum total D of the negative log-likelihood d under the normal assumption at each of the first to third welding points is D=0.010+2.526+1.897=4.43. On the other hand, the sum total E of the negative log-likelihood e under the abnormal assumption at each of the first to third welding points is E=4.605+0.010+0.010=4.63. At a total of two welding points, namely the second and third welding points, among the three welding points, abnormality determinations are made by the determination means 34, but since D<E, a final determination (re-determination) made by the re-determination means 35 is a normality (re-)determination.

The unknown resistance waveform C immediately after dressing on which the re-determination was made that dressing was normal by the re-determination means 35 is further accumulated as the known resistance waveform A immediately after dressing in the data accumulation means 31.

The determination means 34 and the re-determination means 35 determine and re-determine the dressing quality in parallel with the spot welding device 10 performing resistance welding in the production line.

<Dressing Quality Determination Method for Electric Resistance Welding Electrodes>

Figure 7A:
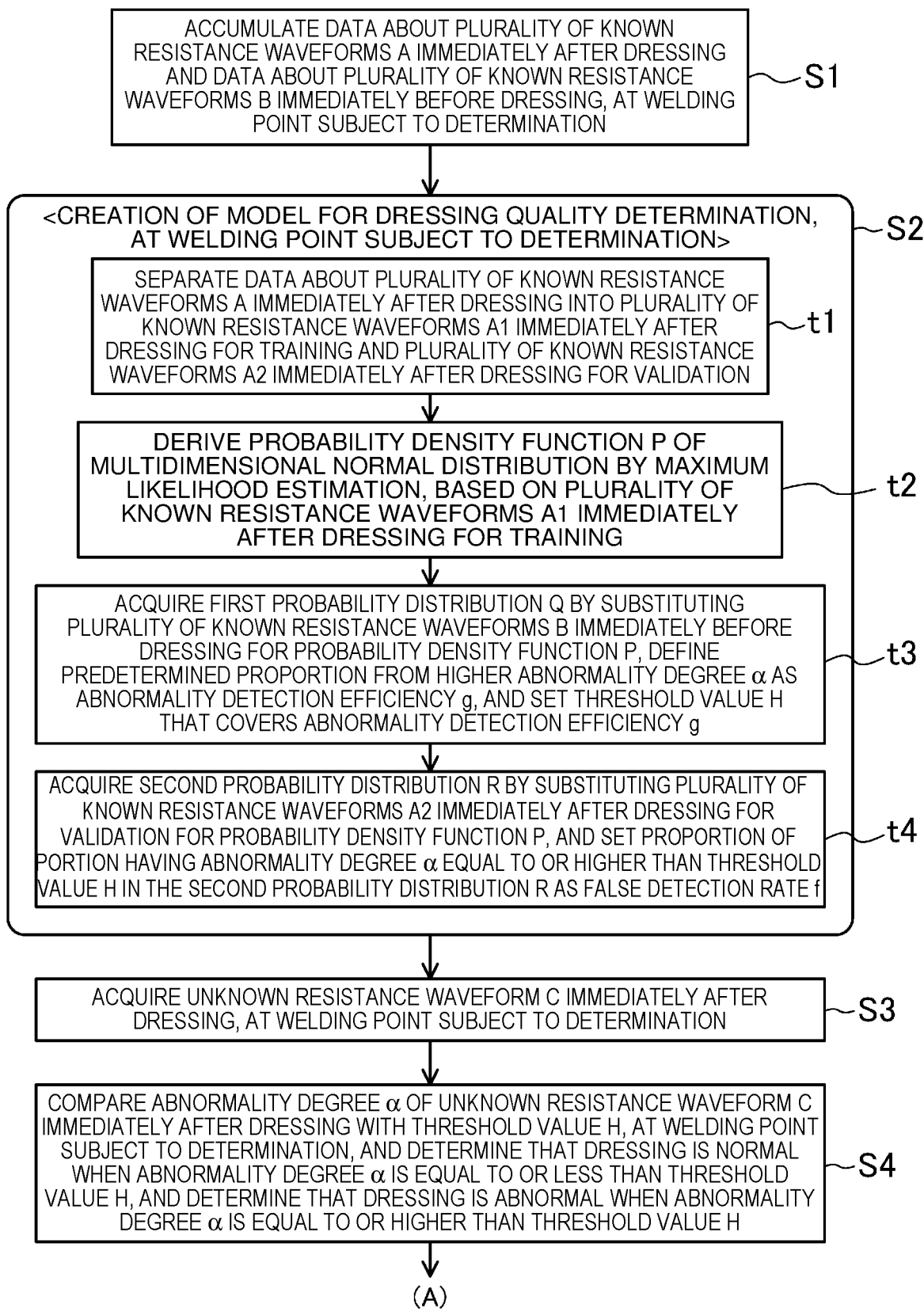
FIG. 7A is a flowchart showing a flow of dressing quality determination (former-period step)
Figure 7B:
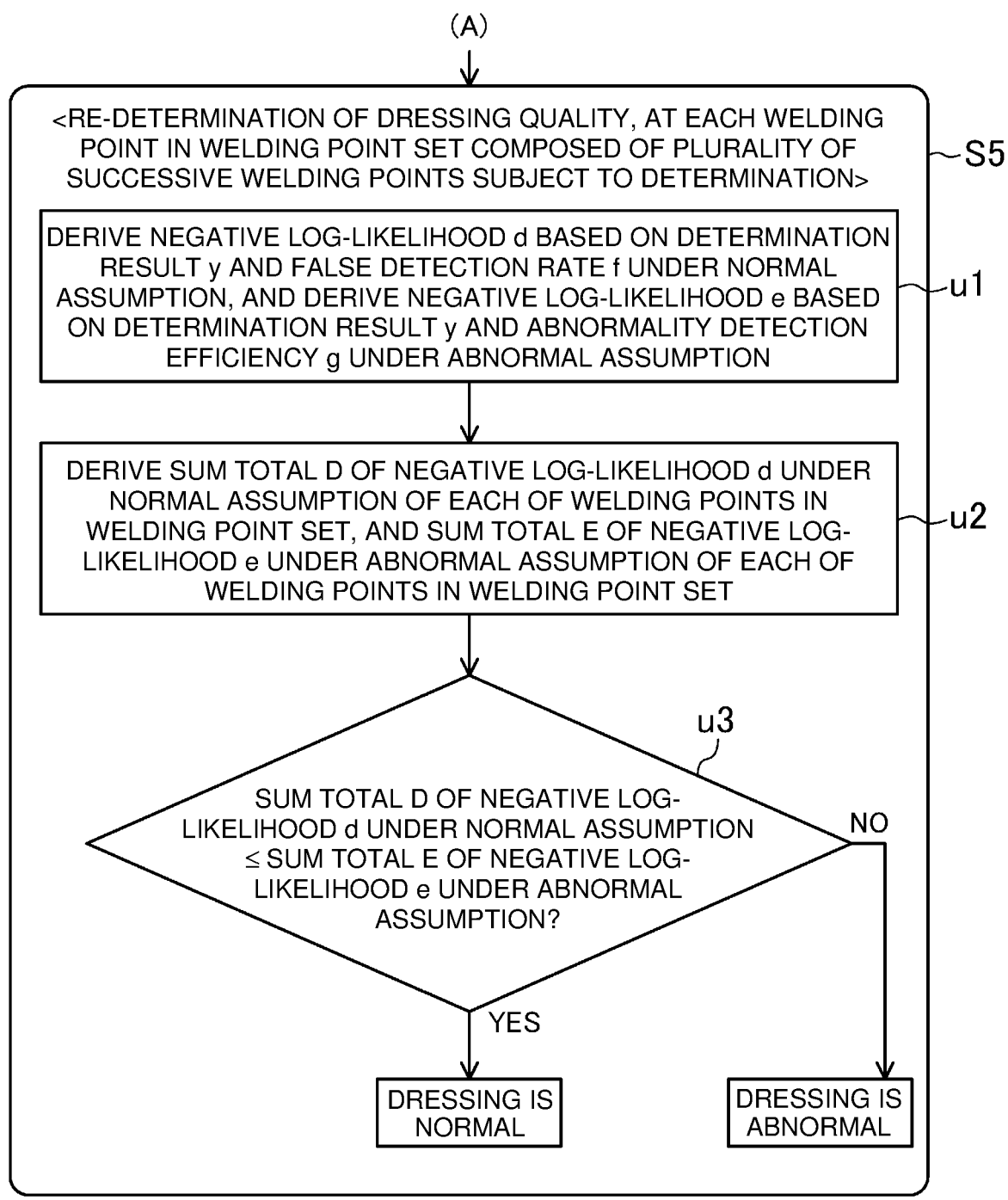
FIG. 7B is a flowchart showing the flow of dressing quality determination (latter-period step).

A flow of the dressing quality determination method for electric resistance welding electrodes will be described. FIGS. 7A and 7B are a flowchart showing a flow of dressing quality determination. The dressing quality determination method for electric resistance welding electrodes according to the present embodiment includes a data accumulation step S1, a model creation step S2, a waveform acquisition step S3, a determination step S4, and a re-determination step S5.

As shown in FIG. 7, first, in the data accumulation step S1, a plurality of pieces (statistically sufficient number) of data about the known resistance waveform A immediately after dressing and data about the known resistance waveform B immediately before dressing are accumulated, for each welding point subject to determination.

Next, in the model creation step S2, a model for setting a threshold value for dressing quality determination by a statistical method (Hotelling's T-squared method) is created, based on the plurality of known resistance waveforms A immediately after dressing and the plurality of known resistance waveforms B immediately before dressing, for each welding point subject to determination.

The model creation step S2 has, as small steps, a data separation step t1, a function deriving step t2, a threshold value setting step t3, and a false detection rate setting step t4.

In the data separation step t1, part of the plurality of known resistance waveforms A immediately after dressing is separated as a plurality of known resistance waveforms A1 immediately after dressing for training Meanwhile, in the data separation step t1, other part of the plurality of known resistance waveforms A immediately after dressing is separated as a plurality of known resistance waveforms A2 immediately after dressing for validation.

Next, in the function deriving step t2, a parameter of a multidimensional (M-dimensional) normal distribution is determined by maximum likelihood estimation, based on the plurality of known resistance waveforms A1 immediately after dressing for training, and the probability density function P is derived.

Subsequently, in the threshold value setting step t3, the plurality of known resistance waveforms B immediately before dressing are substituted for the probability density function P to obtain the first probability distribution Q. In the first probability distribution Q, a predetermined proportion (99%) from the higher abnormality degree α defined by the Mahalanobis distance pertaining to the probability density function P is taken as the abnormality detection efficiency g. Then, the threshold value H that covers the abnormality detection efficiency g is set.

Next, in the false detection rate setting step t4, the plurality of known resistance waveforms A2 immediately after dressing for validation are substituted for the probability density function P to obtain the second probability distribution R. Then, the proportion of a portion of the second probability distribution R with the abnormality degree α equal to or higher than the threshold value H is set as the false detection rate f.

Subsequently, in the waveform acquisition step S3, the unknown resistance waveform C immediately after dressing, which is an unknown resistance waveform immediately after dressing the electrodes, is acquired for each welding point subject to determination. Next, in the determination step S4, whether dressing performed for the electrodes is normal or abnormal is determined by comparing the unknown resistance waveform C immediately after dressing with a threshold value for dressing quality, for each welding point subject to determination.

Specifically, in the determination step S4, the abnormality degree α of the unknown resistance waveform C immediately after dressing is compared with the threshold value H. In the determination step S4, when the abnormality degree a of the unknown resistance waveform C immediately after dressing is equal to or less than the threshold value H, dressing is determined to be normal. On the other hand, in the determination step S4, when the abnormality degree α of the unknown resistance waveform C immediately after dressing is equal to or higher than the threshold value H, dressing is determined to be abnormal.

Next, in the re-determination step S5, the dressing quality is re-determined by considering the likelihood of the result of determination made in the determination step S4, for each of the welding points in the welding point set. The re-determination step S5 has, as small steps, a log-likelihood deriving step u1, a log-likelihood sum deriving step u2, and a log-likelihood sum comparing step u3.

In the log-likelihood deriving step u1, defining an assumption that dressing is normal as a normal assumption, the negative log-likelihood d based on the determination result y and the false detection rate f under the normal assumption is derived. Meanwhile, in the log-likelihood deriving step u1, defining an assumption that dressing is abnormal as an abnormal assumption, the negative log-likelihood e based on the determination result y and the abnormality detection efficiency g under the abnormal assumption is derived.

Subsequently, in the log-likelihood sum deriving step u2, the sum total D of the negative log-likelihood d under the normal assumption of each of the welding points in the welding point set is derived. Moreover, in the log-likelihood sum deriving step u2, the sum total E of the negative log-likelihood e under the abnormal assumption of each of the welding points in the welding point set is derived.

Next, in the log-likelihood sum comparing step u3, when the sum total D of the negative log-likelihood d under the normal assumption is equal to or less than the sum total E of the negative log-likelihood e under the abnormal assumption, dressing is re-determined to be normal. On the other hand, in the log-likelihood sum comparing step u3, when the sum total D of the negative log-likelihood d under the normal assumption is equal to or higher than the sum total E of the negative log-likelihood e under the abnormal assumption, dressing is re-determined to be abnormal.

Data about the unknown resistance waveform C immediately after dressing on which the re-determination was made that dressing was normal in the re-determination step S5 is further accumulated as data about the known resistance waveform A immediately after dressing.

The dressing quality determination method according to the present embodiment is incorporated into the welding step in the production line, and the determination and the re-determination are made in parallel with performing resistance welding.

Functions and Effects of the Present Embodiment

Usually, the probability of dressing being normal is higher than the probability of dressing being abnormal. That is, most of the plurality of known resistance waveforms A immediately after dressing are resistance waveforms when dressing is normal. On the other hand, the known resistance waveform B immediately before dressing is a resistance waveform in a state in which the electrodes immediately before dressing are considerably worn, and approximates a resistance waveform when dressing is abnormal. Using these resistance waveforms when dressing is normal (known resistance waveforms A immediately after dressing) and resistance waveforms when dressing is abnormal (known resistance waveforms B immediately before dressing), an appropriate threshold value for dressing quality determination can be set by a statistical method. Therefore, it is possible to accurately make a dressing quality determination based on the resistance waveforms.

The reliability of a determination result of dressing quality in the determination step S4 (determination means 34) can be found based on the false detection rate f. By considering the false detection rate f, it is possible to examine whether or not the determination result obtained in the determination step S4 (determination means 34) is correct.

Since the forms of the resistance waveforms vary depending on each welding point, the reliability of the false detection rate f, that is, the determination result in the determination step S4 (determination means 34) also varies depending of each welding point. According to this configuration, a welding point set constituted by successive welding points subject to determination is formed. Then, the negative log-likelihood d and e of each of welding points in the welding point set are derived. Thus, a weight based on the reliability of the determination result at each welding point is given. Using the sum totals D and E of the negative log-likelihood d and e at each of welding points for dressing quality determination, a re-determination of dressing quality for the entire welding point set is made by placing great importance on the determination result at the welding point having high reliability (low false detection rate f) (for example, the welding point X). Hence, it is possible to make a more reliable dressing quality determination.

Since new data about the known resistance waveform A immediately after dressing can be accumulated while performing resistance welding, good efficiency is achieved.

The dressing quality can be determined without extending production tact time.

Since the present disclosure is applicable to a dressing quality determination method for resistance welding electrodes and a device for the same, the present disclosure is extremely useful and has high industrial applicability.

What is claimed is:

1. A dressing quality determination method for resistance welding electrodes that determines quality of dressing performed for a pair of electrodes when resistance welding to weld a plurality of metal plates is performed at a plurality of welding points by applying a current to a workpiece formed of a stack of the plurality of metal plates while applying pressure with the electrodes, the dressing quality determination method comprising:

accumulating a plurality of known resistance waveforms immediately after dressing, each of which is a known resistance waveform immediately after dressing the electrodes, and a plurality of known resistance waveforms immediately before dressing, each of which is a known resistance waveform immediately before dressing the electrodes, at a welding point subject to dressing quality determination among the plurality of welding points;

creating, by a statistical method, a model for setting a threshold value for dressing quality determination, based on the plurality of known resistance waveforms immediately after dressing and the plurality of known resistance waveforms immediately before dressing, at the welding point subject to determination;

acquiring an unknown resistance waveform immediately after dressing, which is an unknown resistance waveform immediately after dressing the electrodes, at the welding point subject to determination; and determining whether dressing performed for the electrodes is normal or abnormal by comparing the unknown resistance waveform immediately after dressing with the threshold value, at the welding point subject to determination, wherein the creating of a model includes:

deriving a probability density function of a multidimensional normal distribution by maximum likelihood estimation based on a plurality of known resistance waveforms immediately after dressing for training, which are part of the plurality of known resistance waveforms immediately after dressing;

setting the threshold value that covers abnormality detection efficiency, which represents a predetermined proportion from a higher abnormality degree defined by the Mahalanobis distance pertaining to the probability density function, in a first probability distribution obtained by substituting the plurality of known resistance waveforms immediately before dressing for the probability density function; and setting a proportion of a portion having the abnormality degree equal to or higher than the threshold value in a second probability distribution as a false detection rate, the second probability distribution being obtained by substituting a plurality of known resistance waveforms immediately after dressing for validation, which are other part of the plurality of known resistance waveforms immediately after dressing, for the probability density function, and the determining compares the abnormality degree of the unknown resistance waveform immediately after dressing with the threshold value, determines that dressing is normal when the abnormality degree is equal to or less than the threshold value, and determines that dressing is abnormal when the abnormality degree is equal to or higher than the threshold value.

2. The dressing quality determination method for resistance welding electrodes according to claim 1, wherein a welding point set composed of a plurality of successive welding points subject to determination is formed, the dressing quality determination method further comprises re-determining dressing quality by considering likelihood of a determination result in the determining, at each of the welding points in the welding point set, and the re-determining includes:

deriving negative log-likelihood based on the determination result and the false detection rate under a normal assumption, the normal assumption being an assumption that dressing is normal, and deriving negative log-likelihood based on the determination result and the abnormality detection efficiency under an abnormal assumption, and the abnormal assumption being an assumption that dressing is abnormal;

deriving a sum total of the negative log-likelihood under the normal assumption of each of the welding points in the welding point set, and a sum total of the negative log-likelihood under the abnormal assumption of each of the welding points in the welding point set; and re-determining that dressing is normal when the sum total of the negative log-likelihood under the normal assumption is equal to or less than the sum total of the negative log-likelihood under the abnormal assumption, and re-determining that dressing is abnormal when the sum total of the negative log-likelihood under the normal assumption is equal to or higher than the sum total of the negative log-likelihood under the abnormal assumption.

3. The dressing quality determination method for resistance welding electrodes according to claim 2, wherein the unknown resistance waveform immediately after dressing on which the re-determination was made that dressing was normal in the re-determining is further accumulated as the known resistance waveform immediately after dressing.

4. The dressing quality determination method for resistance welding electrodes according to claim 3, wherein the dressing quality determination method is incorporated into a welding process in a production line, and the determination is made in parallel with performing the resistance welding.

5. A dressing quality determination device for resistance welding electrodes that determines quality of dressing performed for a pair of electrodes when resistance welding to weld a plurality of metal plates is performed at a plurality of welding points by applying a current to a workpiece formed of a stack of the plurality of metal plates while applying pressure with the electrodes, the dressing quality determination device comprising:

a processor configured to:

accumulate a plurality of known resistance waveforms immediately after dressing, each of which is a known resistance waveform immediately after dressing the electrodes, and a plurality of known resistance waveforms immediately before dressing, each of which is a known resistance waveform immediately before dressing the electrodes, at a welding point subject to dressing quality determination among the plurality of welding points;

create, by a statistical method, a model for setting a threshold value for dressing quality determination, based on the plurality of known resistance waveforms immediately after dressing and the plurality of known resistance waveforms immediately before dressing, at the welding point subject to determination;

acquire an unknown resistance waveform immediately after dressing, which is an unknown resistance waveform immediately after dressing the electrodes, at the welding point subject to determination; and determine whether dressing performed for the electrodes is normal or abnormal by comparing the unknown resistance waveform immediately after dressing with the threshold value, at the welding point subject to determination.

6. The dressing quality determination device for resistance welding electrodes according to claim 5, wherein the processor creates the model by:

deriving a probability density function of a multidimensional normal distribution by maximum likelihood estimation based on a plurality of known resistance waveforms immediately after dressing for training, which are part of the plurality of known resistance waveforms immediately after dressing;

setting the threshold value that covers abnormality detection efficiency, which represents a predetermined proportion from a higher abnormality degree defined by the Mahalanobis distance pertaining to the probability density function, in a first probability distribution obtained by substituting the plurality of known resistance waveforms immediately before dressing for the probability density function; and setting a proportion of a portion having the abnormality degree equal to or higher than the threshold value in a second probability distribution as a false detection rate, the second probability distribution being obtained by substituting a plurality of known resistance waveforms immediately after dressing for validation, which are other part of the plurality of known resistance waveforms immediately after dressing, for the probability density function, and the processor, to determine whether dressing performed for the electrodes is normal or abnormal, compares the abnormality degree of the unknown resistance waveform immediately after dressing with the threshold value, and determines that dressing is normal when the abnormality degree is equal to or less than the threshold value, and determines that dressing is abnormal when the abnormality degree is equal to or higher than the threshold value.

7. The dressing quality determination device for resistance welding electrodes according to claim 6, wherein a welding point set composed of a plurality of successive welding points subject to determination is formed, the processor is further configured to re-determine dressing quality by considering likelihood of a determination result when the processor determines whether dressing performed for the electrodes is normal or abnormal, at each of the welding points in the welding point set, and the processor, to re-determine dressing quality:

derives negative log-likelihood based on the determination result and the false detection rate under a normal assumption, the normal assumption being an assumption that dressing is normal, and derives negative log-likelihood based on the determination result and the abnormality detection efficiency under an abnormal assumption, the abnormal assumption being an assumption that dressing is abnormal;

derives a sum total of the negative log-likelihood under the normal assumption of each of the welding points in the welding point set, and a sum total of the negative log-likelihood under the abnormal assumption of each of the welding points in the welding point set; and re-determines that dressing is normal when the sum total of the negative log-likelihood under the normal assumption is equal to or less than the sum total of the negative log-likelihood under the abnormal assumption, and re-determines that dressing is abnormal when the sum total of the negative log-likelihood under the normal assumption is equal to or higher than the sum total of the negative log-likelihood under the abnormal assumption.

8. The dressing quality determination device for resistance welding electrodes according to claim 7, wherein the unknown resistance waveform immediately after dressing on which the re-determination was made that dressing was normal by the re-determination is further accumulated as the known resistance waveform immediately after dressing when the processor accumulates the plurality of known resistance waveforms.

9. The dressing quality determination device for resistance welding electrodes according to claim 8, wherein
the dressing quality determination device is installed in a resistance welding device introduced in a production line, and makes the determination in parallel with the resistance welding device performing the resistance welding.

10. A dressing quality determination method for resistance welding electrodes that determines quality of dressing performed for a pair of electrodes when resistance welding to weld a plurality of metal plates is performed at a plurality of welding points by applying a current to a workpiece formed of a stack of the plurality of metal plates while applying pressure with the electrodes, the dressing quality determination method comprising:
  accumulating a plurality of known resistance waveforms immediately after dressing, each of which is a known resistance waveform immediately after dressing the electrodes, and a plurality of known resistance waveforms immediately before dressing, each of which is a known resistance waveform immediately before dressing the electrodes, at a welding point subject to dressing quality determination among the plurality of welding points;
  creating, by a statistical method, a model for setting a threshold value for dressing quality determination, based on the plurality of known resistance waveforms immediately after dressing and the plurality of known resistance waveforms immediately before dressing, at the welding point subject to determination;
  acquiring an unknown resistance waveform immediately after dressing, which is an unknown resistance waveform immediately after dressing the electrodes, at the welding point subject to determination; and
  determining whether dressing performed for the electrodes is normal or abnormal by comparing the unknown resistance waveform immediately after dressing with the threshold value, at the welding point subject to determination, wherein
the dressing quality determination method is incorporated into a welding process in a production line, and the determination is made in parallel with performing the resistance welding.

11. The dressing quality determination method for resistance welding electrodes according to claim 1, wherein
the dressing quality determination method is incorporated into a welding process in a production line, and the determination is made in parallel with performing the resistance welding.

12. The dressing quality determination method for resistance welding electrodes according to claim 2, wherein
the dressing quality determination method is incorporated into a welding process in a production line, and the determination is made in parallel with performing the resistance welding.

13. The dressing quality determination device for resistance welding electrodes according to claim 5, wherein
the dressing quality determination device is installed in a resistance welding device introduced in a production line, and makes the determination in parallel with the resistance welding device performing the resistance welding.

14. The dressing quality determination device for resistance welding electrodes according to claim 6, wherein
the dressing quality determination device is installed in a resistance welding device introduced in a production line, and makes the determination in parallel with the resistance welding device performing the resistance welding.

15. The dressing quality determination device for resistance welding electrodes according to claim 7, wherein
the dressing quality determination device is installed in a resistance welding device introduced in a production line, and makes the determination in parallel with the resistance welding device performing the resistance welding.

* * * * *